(12) United States Patent
Marzorati et al.

(10) Patent No.: US 8,469,562 B2
(45) Date of Patent: Jun. 25, 2013

(54) BACK-LIT AESTHETIC/DECORATIVE INTERIOR FINISHING ELEMENT FOR PASSENGER COMPARTMENTS OF VEHICLES, IN PARTICULAR CABS OF LORRIES

(75) Inventors: Diego Marzorati, Orbassano (IT); Giovanni Boreanaz, Orbassano (IT); Federica Fino, Orbassano (IT); Stefano Bernard, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 292 days.

(21) Appl. No.: 12/556,174

(22) Filed: Sep. 9, 2009

(65) Prior Publication Data
US 2010/0073953 A1    Mar. 25, 2010

(30) Foreign Application Priority Data

Sep. 19, 2008 (EP) ..................................... 08425615

(51) Int. Cl.
*B60Q 1/00* (2006.01)
(52) U.S. Cl.
USPC ............ 362/488; 362/511; 362/555; 362/556
(58) Field of Classification Search
USPC .................. 362/488, 551, 509, 554–556, 511
See application file for complete search history.

(56) References Cited

U.S. PATENT DOCUMENTS

| 4,907,132 | A  | * | 3/1990  | Parker          | 362/556 |
| 6,160,475 | A  |   | 12/2000 | Hornung et al.  |         |
| 6,854,869 | B1 | * | 2/2005  | Fernandez       | 362/488 |
| 2004/0037091 | A1 | * | 2/2004 | Guy            | 362/582 |
| 2006/0067083 | A1 | * | 3/2006 | Bogdan et al.  | 362/488 |
| 2008/0025039 | A1 | * | 1/2008 | Guillermo      | 362/556 |
| 2009/0059615 | A1 | * | 3/2009 | Wainright      | 362/555 |

FOREIGN PATENT DOCUMENTS

| DE | 198 59 195     | 6/2000 |
| DE | 10 2006 009481 | 9/2007 |
| GB | 2 418 170      | 3/2006 |
| WO | WO 2007/028565 | 3/2007 |

OTHER PUBLICATIONS

European Search Resort for EP 08425615.5 dated Feb. 20, 2009.

* cited by examiner

*Primary Examiner* — Jason Moon Han
*Assistant Examiner* — Jessica M Apenteng
(74) *Attorney, Agent, or Firm* — Nixon & Vanderhye P.C.

(57) ABSTRACT

An interior aesthetic/decorative element for passenger compartments of vehicles, in particular, for the cab of a lorry, having a visible semitransparent surface with a metallic appearance, associated to the back of which are backlighting means that can be activated for providing emission of suffused light through the semitransparent surface.

1 Claim, 4 Drawing Sheets

BACK-LIT AESTHETIC/DECORATIVE INTERIOR FINISHING ELEMENT FOR PASSENGER COMPARTMENTS OF VEHICLES, IN PARTICULAR CABS OF LORRIES

This application claims priority to European Patent Application No. 08425615.5 filed 19 Sep. 2008, the entire contents of which is hereby incorporated by reference.

FIELD OF THE INVENTION

The invention relates to the interior environments of passenger compartments of vehicles, particularly cabs of lorries, and regards more specifically the functional and aesthetic night lighting of said environments.

STATE OF THE PRIOR ART

Typically the interior lighting of cabs of lorries is entrusted to traditional light sources, activation of which during night driving is normally limited on account of the disturbance that light sources of this sort produce in regard to the vision of the driver outwards (reflections). Permanent lighting sources are normally associated to the instrument panel and to the control devices located within the passenger compartment, night lighting of which is, however, strictly circumscribed precisely to instruments and controls.

SUMMARY OF THE INVENTION

The object of the present invention is to make available within the passenger compartment of a vehicle, and more in particular of the cab of a lorry, a source of auxiliary night lighting, i.e., lighting not designed for replacing traditional light sources, which is able to generate an environmental light that will enable improvement of the perception of the internal space, as well as recognition and identification of objects and controls within the cab, without, however, disturbing the vision outwards of the driver, but rather improving driving safety.

According to the invention, the above object is achieved thanks to an aesthetic/decorative interior finishing element for passenger compartments of vehicles, in particular cabs of lorries, basically characterized in that it has a surface in view that is semitransparent to light with a metallic appearance or the like, associated to the back of which are backlighting means that can be activated for providing emission of suffused light by said semitransparent surface.

Thanks to this arrangement, the interior finishing element according to the invention presents, in conditions of daylight or in any case when the backlighting means are deactivated, as an interior furnishing with aesthetic moulding defined by the aforesaid surface in view with a metallic appearance or similar to cloth or other material, whilst, following upon activation of the backlighting means in the absence of daylight, said visible surface diffuses a suffused environmental light that enables the occupants to recognize and identify objects inside the passenger compartment in conditions of complete safety.

The backlighting means can include bundles of optical fibres connected to light sources such as LEDs or the like, or else electroluminescent elements or other functionally equivalent systems.

According to a preferred embodiment of the invention, the surface in view that is semitransparent of the aesthetic/decorative element is in the form of a long horizontal band of relatively modest height, set, for example, along a cross member located in the top area of the front part of the cab.

BRIEF DESCRIPTION OF THE DRAWINGS

The invention will now be described in detail with reference to the annexed drawings, which are provided purely by way of non-limiting example and in which.

DETAILED DESCRIPTION OF THE INVENTION

Figure 1:
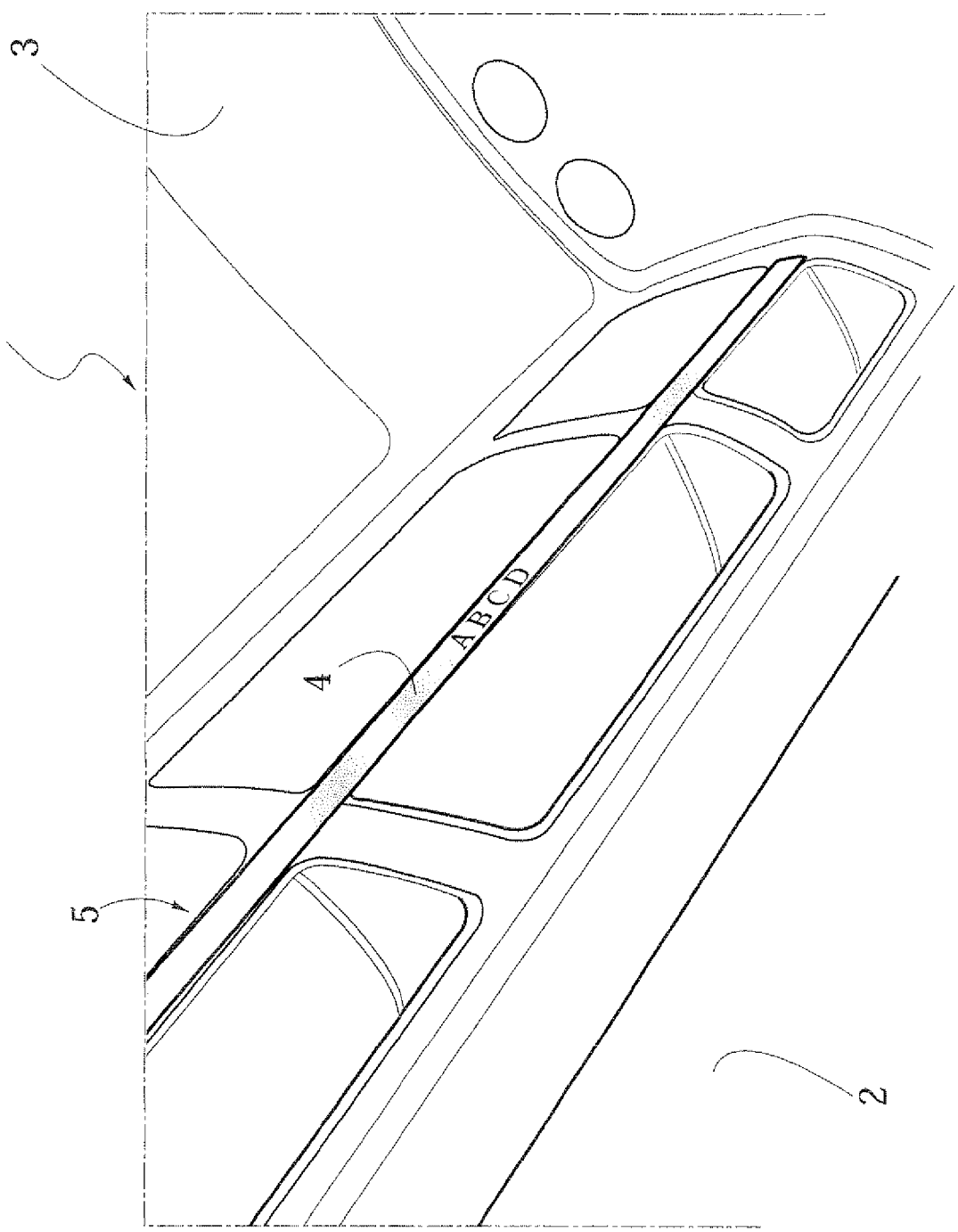
FIG. 1 is a partial and schematic perspective view that shows an example of embodiment of an interior aesthetic/decorative element according to the invention, applied to the cab of a lorry and represented in a first condition.
Figure 2:
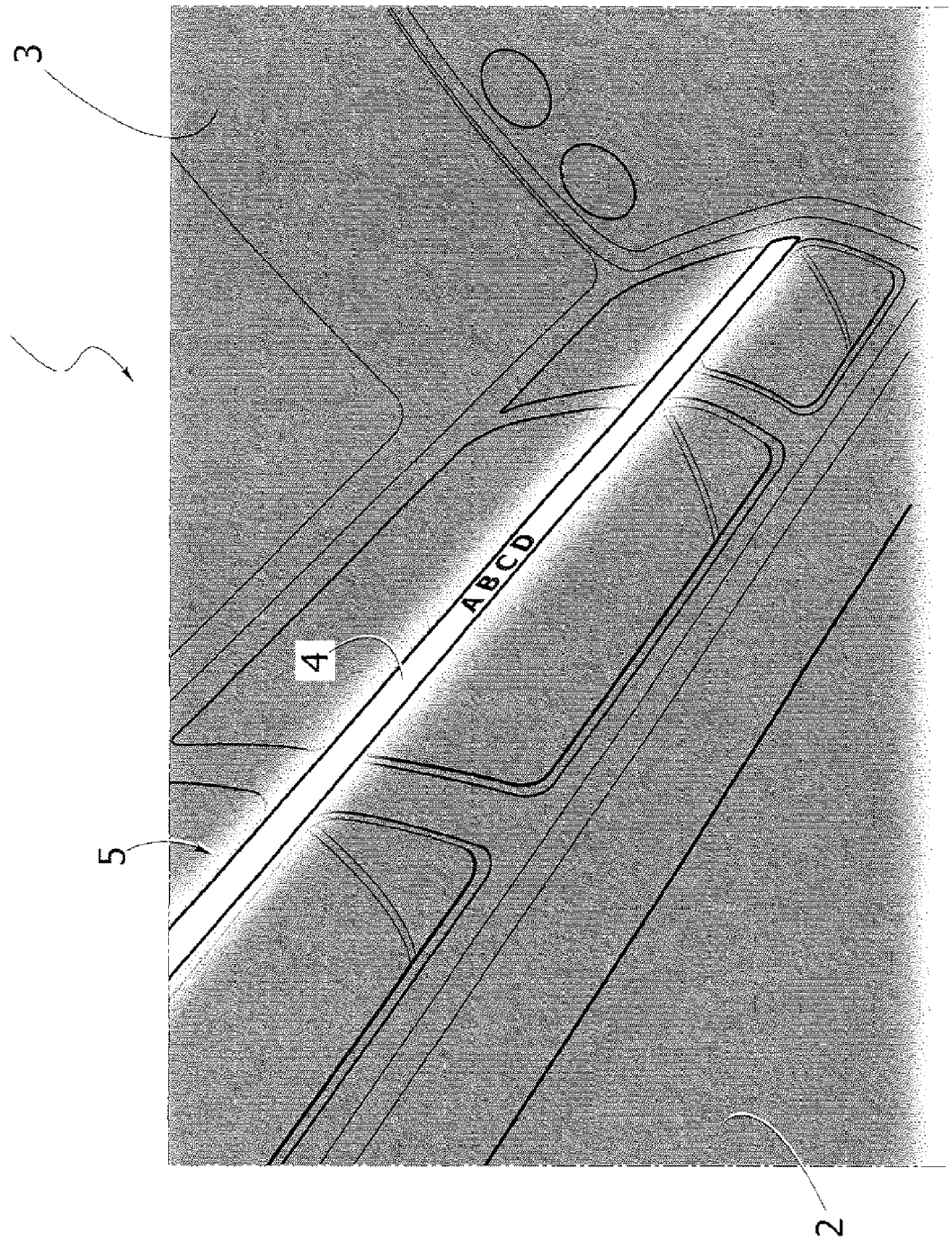
FIG. 2 is a view similar to that of FIG. 1, which shows the aesthetic/decorative element according to the invention in a second condition.

FIGS. 1 and 2 are schematic illustrations of a part of the interior of a cab 1 of a lorry, and more precisely the top area of the front part comprised between the windscreen 2 and the roof 3. Extending along said area is a coating element 4 constituted by a cross member provided, in a generally conventional way, with glove boxes, trays and similar compartment either closed or open, as well as receptacles for insertion of devices, such as radio apparatuses and the like.

According to the invention, the cross member 4 is moreover provided with a fascia 5, which extends, for example, throughout extension of the cross member 4 and has a small height, for example in the region of 25 mm, and which presents a peculiar feature: the surface in view of said fascia 5 has, in conditions of daylight, a metallic appearance, for example a chromed appearance (FIG. 1), whilst in the dark or in any case in conditions of poor lighting of the cab it is able to emit a pale and suffused light (FIG. 2) that enables improvement of the perception of absolute space and recognition and identification of objects by the occupants of the cab without, however, creating any disturbance to the view outwards.

Figure 3:
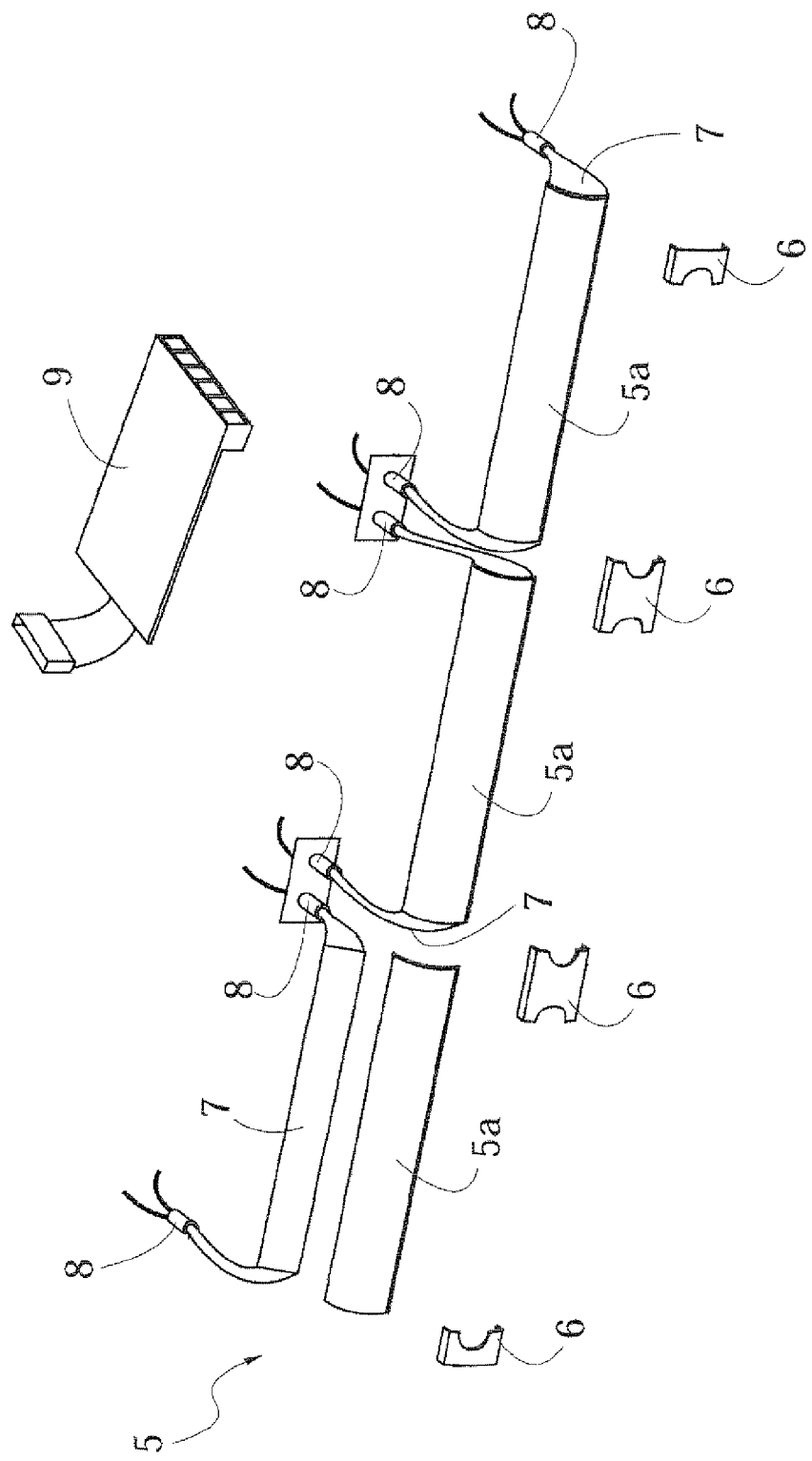
FIG. 3 is an exploded perspective view of a part of the aesthetic/decorative element of FIGS. 1 and 2.

For this reason, and as is illustrated in detail in FIG. 3, the fascia 5 is formed by one or more half-shells 5a set alongside one another, made of transparent plastic material (PMMA-polycarbonate) thermoformed or milled, with a finish in view that creates an aesthetic metallic effect, but semipermeable to light. Said semitransparent metallic effect can be obtained by means of different technologies, such as, for example, via deposition by hot stamping of a light-permeable film, or else by high-vacuum metallization means for the application of a thin metal layer after possible prior treatment of the surface of the half-shells 5a to obtain, for example, effects of brushing or satin finish.

The half-shells 5a can be continuous or else connected to one another and to the cross member 4 via joining elements 6.

Set on the back of each half-shell 5a is a respective backlighting device 7, for example an optical-fibre device or else alternatively a device with electroluminescent elements possibly with a thermoformed structure, or equivalent systems.

Figure 4:
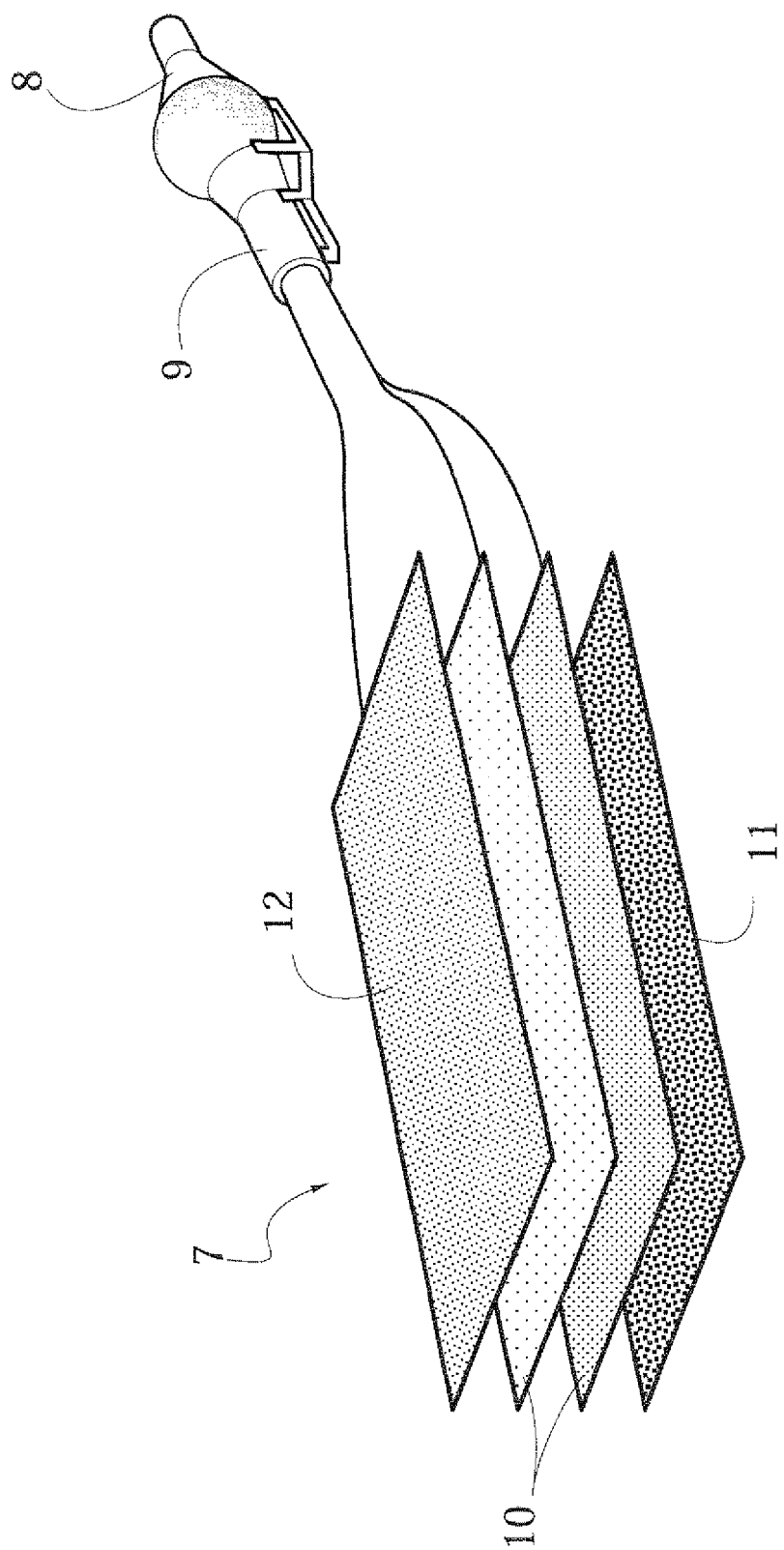
FIG. 4 is an exploded perspective view at a larger scale that shows an example of embodiment of the system of backlighting of the aesthetic/decorative element according to the invention.

In the first case, the structure of the backlighting device can be of the type represented in FIG. 4: a light source 8, constituted by one or more LEDs and including the optical system, supplies a bundle of optical fibres 9 grouped together in one or more woven layers 10, which are in turn enclosed between a reflecting layer 11 and a protective and diffusive layer 12 facing the semitransparent surface of the respective half-shell 5a.

The light sources 8 are connected to an electronic actuation interface 9, which enables activation, deactivation, and also adjustment and management of intensity thereof and possibly change of colour in a controlled or even automatic way.

As explained previously, in the deactivated condition of the backlighting device the visible surface of the half-shells 5a that make up the fascia 5 has a metallic appearance, whilst in the activated condition said visible surface emits a diffused and suffused light.

Even though the invention has been described with specific reference to an aesthetic/decorative element located in the top area of the front part of the cab of a lorry, it is likewise advantageously applicable to aesthetic/decorative elements located in different areas, for example, on the inner panels of the doors in a position corresponding to or set underneath the armrests thereof, to provide a diffused or grazing lighting effect, or located elsewhere in the cab.

In addition, the surface 5 in view of the aesthetic/decorative element may present an appearance different from the metallic one, for example similar to cloth or some other material.

Of course, the details of construction and the embodiments may vary widely with respect to what is described and illustrated herein, without thereby departing from the scope of the present invention as defined in the ensuing claims.

What is claimed is:

1. An interior decorative element for a passenger compartment of a vehicle, wherein the element has a surface in view that is semitransparent to light with a metallic appearance, associated to the back of which are backlighting means that can be activated for providing the emission of suffused light by said surface semitransparent to light, wherein said backlighting means include optical fibres, wherein said semitransparent surface is defined by one or more half-shells set alongside one another, made of transparent plastic material having a finish layer providing said metallic appearance, and wherein said optical fibres are provided in the form of fabrics superimposed to each other in at least two superimposed woven layers, which are in turn enclosed between a reflecting layer and a protective and diffusive layer facing the semitransparent surface of the respective half-shell, said optical fibers being grouped in a bundle connected to a light source constituted by one or more LEDs, the light source being controlled by an electronic actuation interface, wherein the electronic actuation interface, which controls the light source, is configured to enable activation, deactivation, and also adjustment of intensity and color of the light, wherein the superimposed woven layers of optical fibers are grouped in two bundles extending from opposite ends of the respective half-shells and are connected to two different LED sources, wherein said semitransparent surface is in the form of a horizontal band, wherein said horizontal band is set along a cross member located in a top area of a front part of the passenger compartment, and wherein the passenger compartment is a cab of a lorry.

* * * * *